C. RICHARDSON.
Flattening and Tempering Saws.
No 157,296. Patented Dec. 1, 1874.
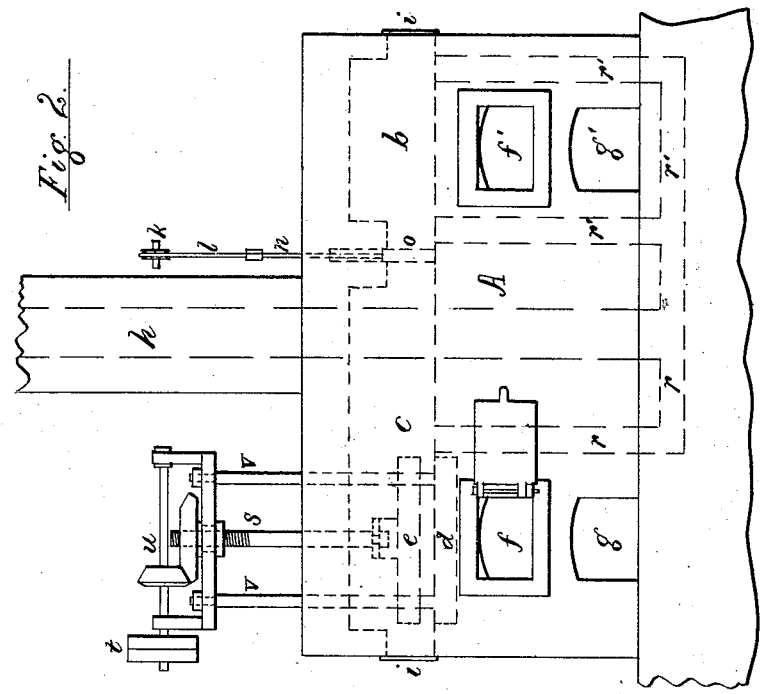
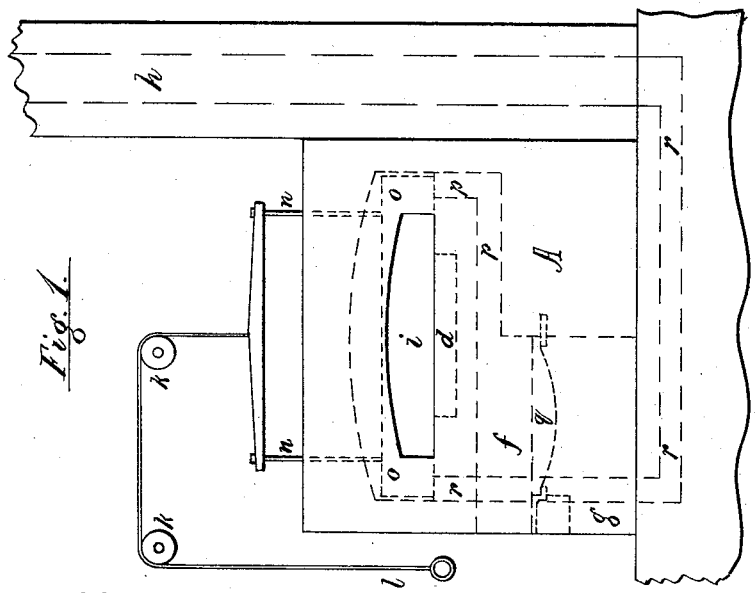
Witnesses.
Henry C. Sleman
Thos. S. Crane
Inventor.
Christopher Richardson

UNITED STATES PATENT OFFICE.

CHRISTOPHER RICHARDSON, OF NEWARK, NEW JERSEY.

IMPROVEMENT IN FLATTENING AND TEMPERING SAWS.

Specification forming part of Letters Patent No. 157,296, dated December 1, 1874; application filed September 14, 1874.

*To all whom it may concern:*

Be it known that I, CHRISTOPHER RICHARDSON, of Newark, Essex county, New Jersey, have invented a new and useful Mode of Flattening and Tempering Saws, and apparatus for effecting the same; and I do hereby declare that the following is a full, clear, and exact description thereof, reference being had to the accompanying drawings.

Figure 1 is an end view, and Fig. 2 a side view, of the oven.

In the manufacture of saws by the ordinary methods it is found that the steel plates employed for the purpose need to be flattened by hammering before hardening; and this is done with the design to save hammering after the saw is hardened and tempered.

Each saw is, therefore, after cutting into shape and cutting the teeth, hammered by hand until the irregularities of the surface are greatly diminished.

The saw is then heated and dipped in oil to harden it, and it is then tempered, after which the saw requires a most elaborate hammering to fit it for the grinding process and make it marketable.

This makes two manual operations of a very costly character necessary to the production of each saw.

To diminish this expense I have devised the following mode of flattening saws before hardening, which not only avoids the first hammering of the saw by hand, but reduces the whole cost of straightening the saw about two-thirds. It further diminishes the expense of grinding one-third, as the saw is comparatively free from the hammer-marks produced by the old method.

In my improved method I employ an oven, A, constructed at one end, $b$, to receive the saws and give them any required heat; and, separated from this by a damper or door, $o$, I have arranged a chamber or space, $c$, containing a pair of heavy iron plates, $d\ e$, connected with the screw $s$, rods $v\ v$, and gearing $t$ and $u$, so as to exert a powerful pressure upon the saw when placed between them. Under the lower plate $d$ is a furnace, $f$, furnished with grates $q$ and ash-door $g$. The hot gases from this furnace heat the fire-bricks under the plate $d$, and, passing through the passage $p$, circulate between and around the plates $d$ and $e$, from thence passing downward through the flue $r$ to the chimney $h$.

The space $b$, designed to heat the saws for flattening or tempering, is similarly constructed, being furnished with a furnace, $f'$, from which the heat passes through a flue similar to $p$, and across the floor of the oven, to the downward flues $r'\ r'$, and so to the chimney $h$.

When the door $o$ is raised, the chamber containing the plates communicates directly with the heating end of the oven $b$, where the saws are first introduced.

Instead of hammering the saws to flatten them before hardening, I place them in the oven at $b$ until quite hot, and then, raising the door $o$, transfer them to the hot plates $d$ and $e$, and then press them in that softened condition, after which they are reheated a little, if necessary, and transferred directly to the bath of oil to be hardened.

When ready to have the temper drawn they are pressed again between the heated plates and tempered to the required degree.

Of course, after tempering, the saw requires to be hammered flat; but experience has proved that saws flattened in my oven before hardening, and tempered by my method, need two-thirds less hammering afterward than when otherwise treated, from the absence of any small irregularities in the steel, which are, to a great extent, removed by the process just described.

It is well known that steel warps in hardening, where its density has been altered by hammering; and it can be readily seen that, by my process, where the sheet of steel is flattened by a uniform pressure applied to it in a softened condition, it cannot acquire, in hardening, the short kinks and irregularities so tedious to remove afterward.

I am aware that ovens somewhat similar to mine have been constructed for flattening and annealing glass; but I have no desire to claim any construction in general resembling mine, but solely to secure the exclusive right to heat, flatten, and temper saws in an oven such as I have specifically described herein, containing a chamber for heating the saws, and a chamber contiguous thereto containing plates adapted to press and flatten the saws.

Having thus described my invention, I claim, and desire to secure by Letters Patent, the following:

The improved oven for flattening and tempering saws, constructed with a chamber for heating the saws, and a chamber contiguous thereto containing plates to press and flatten the saws, substantially as described.

CHRISTOPHER RICHARDSON.

Witnesses:
    THOS. S. CRANE,
    JOHN P. BROOKS.